C. L. TOMLINSON.
WHEEL.
APPLICATION FILED OCT. 24, 1912.

1,116,648.

Patented Nov. 10, 1914.

Witnesses
R. H. Baughman
E. W. Baughman

Clarence L. Tomlinson
Inventor.
By D. Witzenberg
Attorney.

UNITED STATES PATENT OFFICE.

CLARENCE L. TOMLINSON, OF PORTLAND, OREGON.

WHEEL.

1,116,648.  Specification of Letters Patent.  Patented Nov. 10, 1914.

Application filed October 24, 1912. Serial No. 727,581.

*To all whom it may concern:*

Be it known that I, CLARENCE L. TOMLINSON, a citizen of the United States, residing in the city of Portland, county of Multnomah, and State of Oregon, have invented certain new and useful Improvements in Wheels, of which the following is a specification.

My invention relates to wheels, and more particularly to certain features of improvement in the construction of the hub portion thereof whereby the spokes of a wheel can be adjusted radially for the purpose of expanding the felly within the tire, thereby tightening the latter and making the wheel more rigid and serviceable.

One of the salient objects of my invention is to provide certain improvements in the construction of the wheel shown and described in my U. S. Letters Patent No. 926,626, issued to me under date of June 29, 1909, and also in the construction of the wheel shown and described in my pending application filed April 3, 1912, under Serial No. 688,297, whereby to overcome certain objections thereto.

In this improvement I do away with a threaded cone and thereby avoid any twisting or shifting of the inner ends of the spokes as the cone is screwed into place. I also use fewer gibs at the inner ends of the spokes and at the same time get a better and stronger construction, for the reason that the inner, or butt, ends of the spokes can be made larger, and instead of putting a hole through the inner end of each spoke for the holding bolt, I use one hole between the butt ends of alternate pairs of spokes, thereby removing only half as much material from the ends of the spokes in making the holes.

By using fewer gibs and placing them between alternate pairs of spoke ends, instead of between every two ends, I am able to use a gib of greater angle, and thereby secure a relatively greater pressure radially outwardly at the butt ends of the spokes, as said gibs are forced outwardly.

Other improvements and advantages will be apparent from the following description of the invention, shown in the accompanying sheet of drawings, and in which,—

Figure 1:
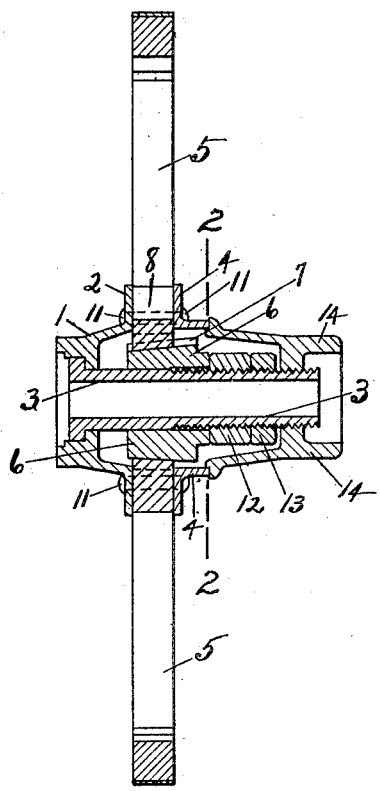
Figure 2:
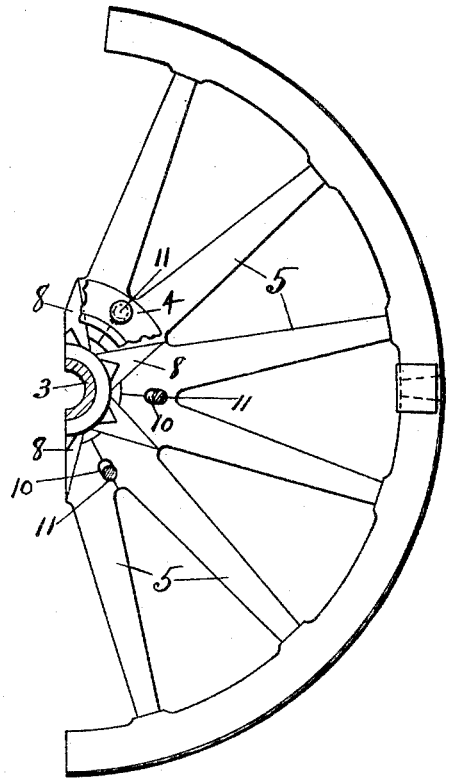
Figure 3:
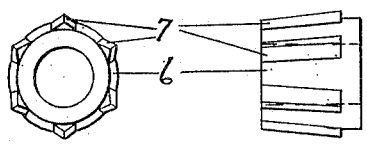
Figure 4:
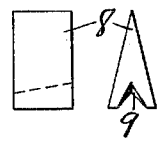

Figure 1 is a vertical sectional view of a wheel embodying my invention; Fig. 2 is a sectional side elevation thereof; Fig. 3 shows end and side elevations of a cone element; and Fig. 4 shows side and edge views of a gib.

Referring now to the drawings, the hub is composed of a shell or body portion 1, having a flange 2, and adapted to receive therein an axle box 3, which is threaded exteriorly, as indicated. A clamping ring portion 4, of angular form in cross section, constitutes a part of the hub shell or body and coöperates with the flange 2 in receiving and holding therebetween the spokes 5. Slidably mounted upon the axle box 3, is a cone element 6, provided exteriorly with longitudinally extending ribs 7. Mounted between the inner or butt ends of alternate pairs of the spokes 5, are wedge shaped gibs 8, provided in their ends with grooves, as 9, adapting them to fit upon the ribs 7 of the cone element 6. Between alternate pairs of spokes, at their butt ends, I provide elongated holes 10 to receive bolts 11, through the flange 2 and the ring 4, as indicated, whereby to clamp the inner ends of the spokes therebetween. It will be noted that I alternate the gibs 8 and the bolts 11, instead of putting gibs between every pair of spokes, and a hole through each spoke end.

As a means for forcing the cone element 6 inwardly, I provide a nut 12, adapted to screw upon the axle box 3, with a lock nut 13, for securing it in place. An outer shell portion 14 of the hub body is also screwed on to the axle box 3 and into interfitting engagement with the ring 4, thereby inclosing the whole and giving a neat appearance to the hub.

By this construction and arrangement, it will be readily seen that I avoid the threaded cone referred to, which must be screwed into place, and to which there is more or less objection, and instead thereof, I provide a construction whereby an expanding cone element is slidably mounted upon an axle box and has a sliding engagement with a series of gibs, especially adapted thereto, and which, when forced outwardly by said cone element, produce a more direct longitudinal movement of said spokes outwardly.

I am aware that slight changes and modifications can be made in the embodiment of the invention here shown and described for purposes of illustration, and I do not, therefore limit the invention to the particular showing here made, except as I may be limited by the hereto appended claims.

I claim:

1. In a wheel, the combination with a hub body, spokes, a felly, tire, and an axle box in said hub threaded exteriorly, of a cone shaped element mounted to slide longitudinally on the axle box, a series of wedges interposed between the butt ends of the spokes and slidably engaging the cone shaped element, said cone shaped element being spaced from engagement with the spokes, and the spokes resting at their inner ends entirely upon the said wedges, and a nut upon the axle box for forcibly sliding said cone shaped element longitudinally between the axle box and the said wedges for the purpose set forth.

2. In a wheel, the combination with a hub body, spokes, a felly, tire, and an axle box in said hub threaded exteriorly, of a cone-shaped element mounted to slide longitudinally on said axle box and provided with ribs extending longitudinally thereof, said cone-shaped element being spaced from the inner ends of the spokes, a series of gibs interposed between the butt ends of some of the spokes and slidably engaging the cone-shaped element, said gibs having grooves at their inner ends extending longitudinally thereof adapted to slidably fit the ribs upon the cone-shaped element, a nut threaded on the axle box for forcibly moving the cone-shaped element upon the axle box in engagement with said gibs, for the purpose set forth.

Signed at Portland, Oregon, this 17th day of October, 1912.

CLARENCE L. TOMLINSON.

In presence of—
G. A. NICHOLS,
E. E. DARING.

---

Copies of this patent may be obtained for five cents each, by addressing the "Commissioner of Patents, Washington, D. C."